(12) United States Patent
Ferencz

(10) Patent No.: US 6,243,275 B1
(45) Date of Patent: Jun. 5, 2001

(54) DC TO DC POWER CONVERTER USING SYNCHRONOUSLY SWITCHED SWITCHES

(75) Inventor: Andrew Ferencz, Cambridge, MA (US)

(73) Assignee: Galaxy Power, Inc., Westborough, MA (US)

( * ) Notice: Subject to any disclaimer, the term of this patent is extended or adjusted under 35 U.S.C. 154(b) by 0 days.

(21) Appl. No.: 09/406,518

(22) Filed: Sep. 28, 1999

(51) Int. Cl.[7] .................................................. H02M 3/335
(52) U.S. Cl. ............................ 363/17; 363/127; 363/132
(58) Field of Search .............................. 363/17, 127, 132

(56) References Cited

U.S. PATENT DOCUMENTS

| | | | |
|---|---|---|---|
| 4,399,499 | * | 8/1983 | Butcher et al. .......................... 363/17 |
| 4,661,897 | * | 4/1987 | Pitel ........................................ 363/17 |
| 4,953,068 | * | 8/1990 | Henze ..................................... 363/127 |
| 5,134,307 | * | 7/1992 | Nakano .................................. 363/17 |
| 5,355,293 | * | 10/1994 | Carlstedt .............................. 363/132 |
| 5,414,609 | * | 5/1995 | Levran et al. ........................ 363/132 |
| 5,546,295 | * | 8/1996 | Prete et al. ............................. 363/17 |
| 5,625,539 | * | 4/1997 | Nakata et al. ........................ 363/132 |
| 5,774,351 | * | 6/1998 | Hsieh et al. ............................ 363/17 |
| 5,880,939 | * | 3/1999 | Sardat .................................... 363/17 |
| 6,002,603 | * | 12/1999 | Carver ................................... 363/132 |

* cited by examiner

*Primary Examiner*—Jeffrey Sterrett
(74) *Attorney, Agent, or Firm*—Cesari and McKenna, LLP; A. Sidney Johnston

(57) ABSTRACT

A full bridge and half bridge dc-dc converter including a primary side having switching devices connected to a transformer, and a primary side controller, a secondary side including switching devices connected to a secondary side of the transformer, an inductor, and secondary side controller, a central control synchronizing the primary side controller and the secondary side controller, and a set of rules for controlling the primary side and secondary side switches such that a utilization rate exceeds fifty percent.

7 Claims, 8 Drawing Sheets

| PRIMARY | | SECONDARY | |
|---|---|---|---|
| ON | OFF | ON | OFF |
| 86, 92 | 88, 90 | 98 | 100 |
|  | 86, 92<br>88, 90 | 98 | 100 |
|  | 86, 92<br>88, 90 | 98<br>100 |  |
|  | 86, 92<br>88, 90 | 100 | 98 |
| 88, 90 | 86, 92 | 100 | 98 |
|  | 88, 90<br>86, 92 | 100 | 98 |
|  | 88, 90<br>86, 92 | 98<br>100 |  |

FIG. 6

| PRIMARY | | SECONDARY | |
|---|---|---|---|
| ON | OFF | ON | OFF |
| 86, 92 | 88, 90 | 98 | 100 |
| 92 | 88, 90 86 | 98 | 100 |
| 90 92 | 86 88 | 98 100 | |
| 90 | 86 88 92 | 100 | 98 |
| 88, 90 | 86, 92 | 100 | 98 |
| 90 | 86, 92 88 | 100 | 98 |
| 90 92 | 86 88 | 98 100 | |

FIG. 7

| PRIMARY | | SECONDARY | |
| --- | --- | --- | --- |
| ON | OFF | ON | OFF |
| 126 | 128 | 134 | 136 |
|  | 126 128 | 134 | 136 |
|  | 126 128 | 134 136 |  |
|  | 126 128 | 136 | 134 |
| 128 | 126 | 136 | 134 |
|  | 126 128 | 136 | 134 |
|  | 126 128 | 134 136 |  |
|  | 126 128 | 134 | 136 |

FIG. 8

DC TO DC POWER CONVERTER USING SYNCHRONOUSLY SWITCHED SWITCHES

FIELD OF THE INVENTION

The present invention relates to the field of power converters and, more particularly, to a synchronous rectifier for a power converter with improved performance features and characteristics.

BACKGROUND OF THE INVENTION

As is well known, synchronous rectifiers are known to be used in electric power converters. When the power converter incorporates a transformer for galvanic isolation, the control of the synchronous rectifiers becomes critical to the proper operation of the power converter. A synchronous rectifier, as used in a power converter employing a transformer, can be defined as a circuit employing two or more synchronized field effect transistors (SynchFETs) or metal oxide field effect transistors (MOSFETs) as rectifying devices and related drive circuitry to control the on-off cycling of the MOSFETs. A synchronous rectifier is a switch that is controlled to behave as a rectifier does such that the switch is in the ON-state when the rectifier would be conducting current and in the OFF-state when the rectifier would be blocking voltage. The switch can be chosen to have a lower voltage drop when conducting current reducing the power loss and increasing the efficiency. MOSFETs are a good device to choose to use as a synchronous rectifier because they contain an intrinsic diode that allows them to behave as a normal rectifier. This reduces the timing requirements for the control circuit. In addition, state-of-the-art devices are now available with very low ON-resistance that greatly decreases the power loss for high current converters. Those skilled in this art call a MOSFET that is used as a synchronous rectifier a SynchFET.

The control of the synchronous rectifier determines the improvement the synchronous rectifiers give to the efficiency of the power converter. As is well known, several methods historically have included deriving the control function from the waveforms created by the transformer and deriving the control function from the control of the main converter switches on the other side of the transformer, the primary side. Such arrangements do not take full advantage of the synchronous rectifier to conduct the power at maximum possible duty-cycle.

As is also well known, existing synchronous rectifier circuits result in a "utilization rate" of the SynchFET's (the percentage of the time that they are in the ON-state) of 50% or less. This percentage will vary with the input voltage and output current to satisfy the regulation control parameters.

What is needed is a synchronous rectifier control method and power topology that addresses these and other problems in a simple, efficient, cost effective manner.

SUMMARY OF THE INVENTION

In accordance with the principles of the present invention a full bridge and half bridge dc-dc converter is provided including a primary side having switching devices connected to a transformer, and a primary side controller, a secondary side including switching devices connected to a secondary side of the transformer, an inductor, and secondary side controller, a central control synchronizing the primary side controller and the secondary side controller, and a set of rules for controlling the primary side and secondary side switches such that a utilization rate exceeds fifty percent. Such an arrangement produces circuits which result in all switching devices in the on-state at least fifty percent up to but not including one hundred percent of the switching period, all switching devices on at least seventy percent of the switching period for nominal input voltage conditions, the switching devices are never turned-on when a voltage is present from their drain to source otherwise known as zero-voltage-switching, results in clamping of the transformer winding voltage to zero volts during the time when all switching devices are simultaneously conducting, and results in less EMI generated by a floating transformer winding due to the clamping of the winding during the simultaneous conduction of all switching devices.

BRIEF DESCRIPTION OF THE DRAWINGS

The novel features believed characteristic of the invention are set forth in the appended claims. The invention itself, however, as well as features and advantages thereof, will be best understood by reference to the detailed description of specific embodiments which follows, when read in conjunction with the accompanying drawings, wherein:

FIG. 6 is a table showing a timing relationship;

FIG. 7 is a table showing a timing relationship; and

FIG. 8 is a table showing a timing relationship.

DESCRIPTION OF THE PREFERRED EMBODIMENT(S)

Figure 1:
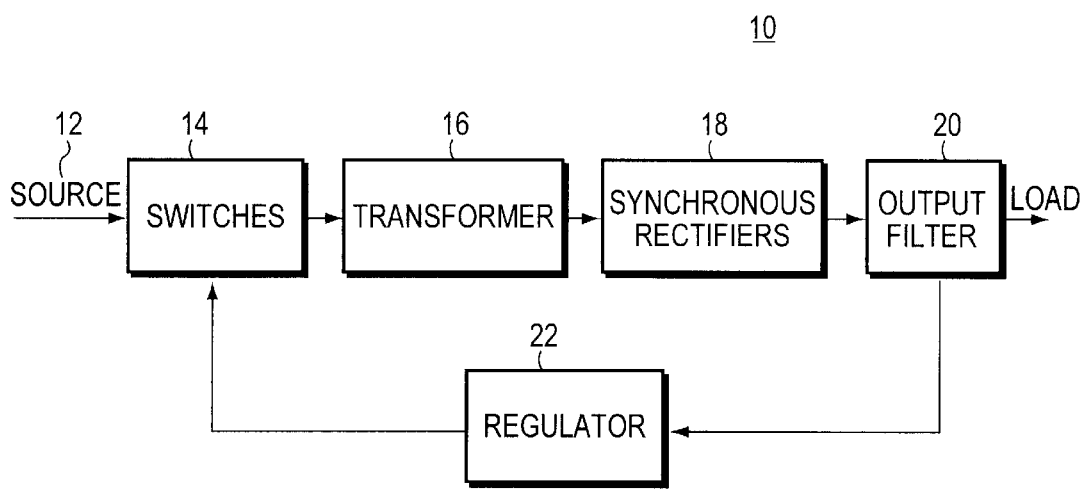
FIG. 1 is a block diagram of an exemplary power supply.

Referring to FIG. 1, a block diagram of an exemplary power supply 10 obtained from a primary source 12 is shown to include a number of switches 14, a transformer 16, a rectifier 18, a filter 20, and a regulator 22. With the exception of the rectifier 18, whether each of the remaining circuit functions is employed depends on the application. The transformer 16 adjusts the switched ac voltage created by the switches 14 so that after rectification 18, the appropriate dc amplitude is achieved. The rectifier 18 converts an ac voltage to a pulsating dc signal. The filter 20 averages the waveform by eliminating the ripple from the rectifier 18 output. The regulator 22 maintains a constant voltage level independent of load conditions or variations in the amplitude of the supply 12.

Figure 2:
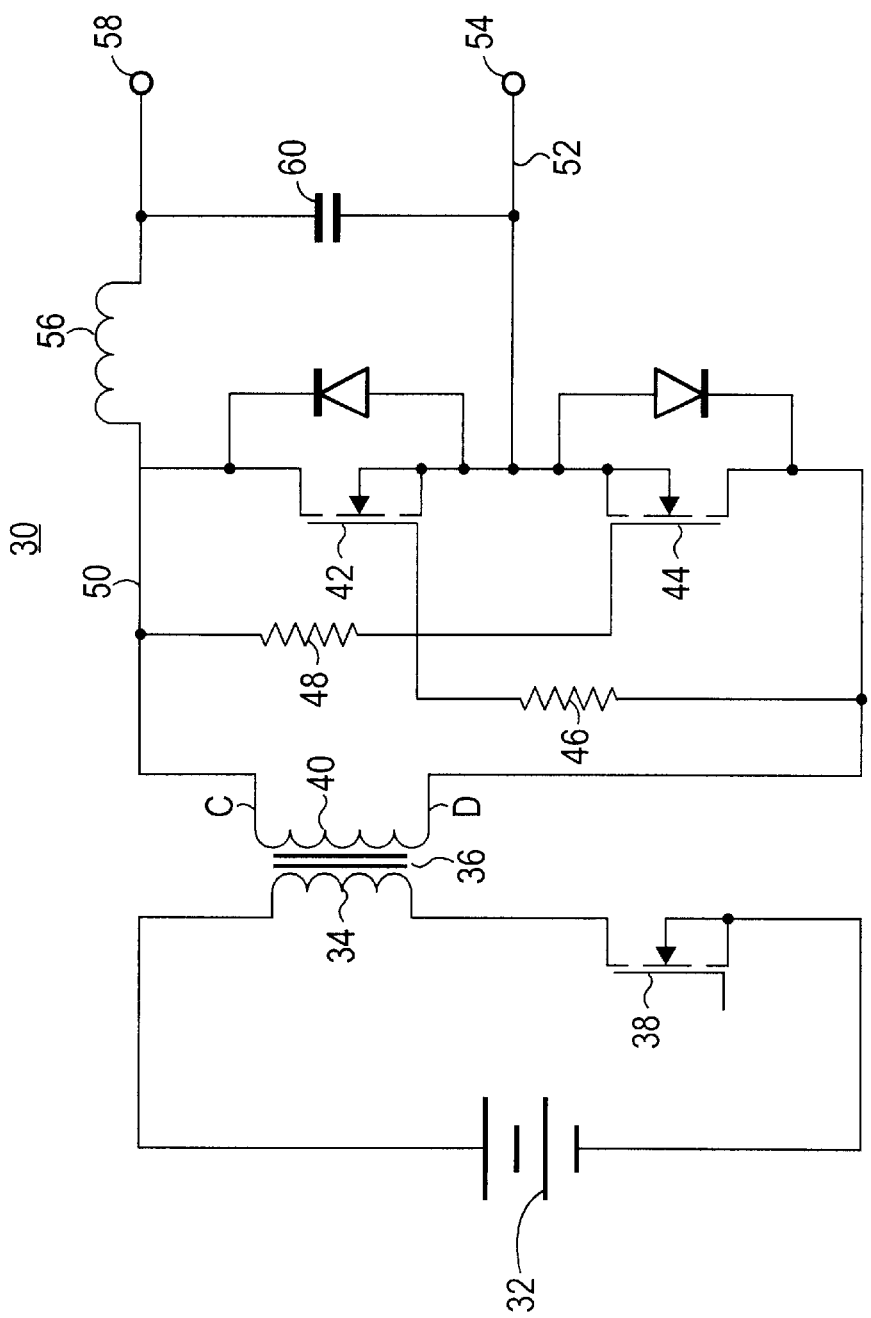
FIG. 2 is a block diagram of an exemplary prior art rectifier circuit.

Referring to FIG. 2, an exemplary prior art rectifier circuit 30 is shown. A direct current source 32 feeds a primary winding 34 of a transformer 36. The current that supplies the primary winding 34 is periodically interrupted by an electronic switch 38, as a result of which an approximately rectangular current and voltage pulse arises in the secondary winding 40 of the transformer 36. A first metal-oxide-semiconductor field-effect transistor (MOSFET) 42 and a second MOSFET 44, the gates of which are triggered by two resistors 46 and 48, are used as controlled rectifiers, and supply two lines 50 and 52 with current in phase with the switch 38. MOSFETs are used in switching applications and can provide controlled-source characteristics. The line 52 is connected directly to a negative output 54, while a storage choke 56 is connected between a positive output 58 and the drain electrode of first MOSFET 42. The resistor 48 is connected to the secondary winding 40 at end C, the resistor 48 is connected to the secondary winding 40 at end D. The end C of the secondary winding 40, the connection of the resistor 48, the drain electrode of first MOSFET 42, and one of the connections of the storage choke 56 form one node, while the end D of the secondary winding 40, the connection of the resistor 46, and the drain electrode of second MOSFET 44 form an additional node. The source electrodes of the first and second MOSFETs 42 and 44 are connected to the line 52. Between the outputs 58 and 54 there is a capacitor 60 that has a smoothing and storage function. This circuit requires that a passive load be applied between the outputs 54 and 58. The two so-called substrate diodes of the first and second MOSFETs 42 and 44 are shown as well by means of dashed lines.

Figure 3:
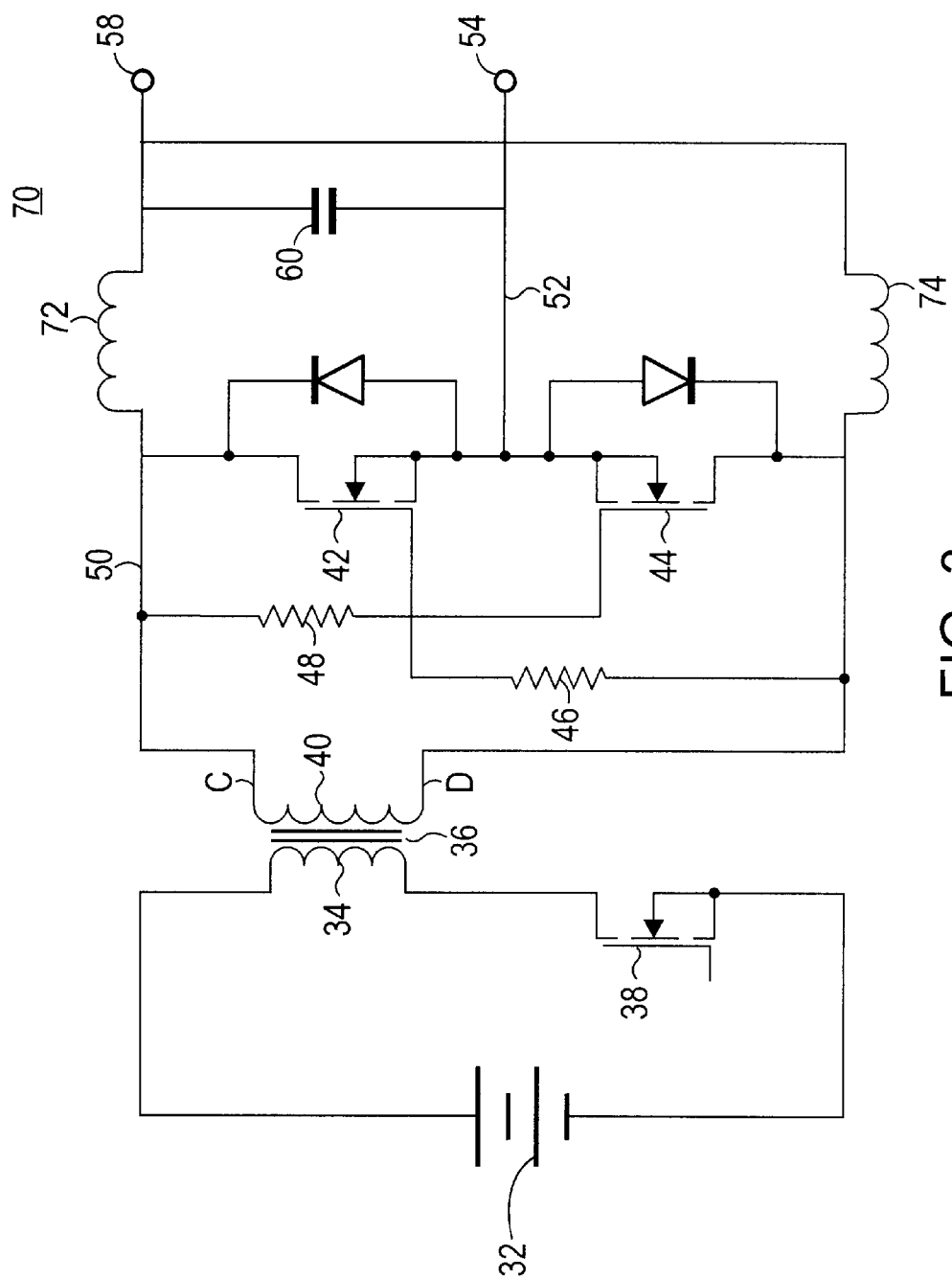
FIG. 3 is a block diagram of a variation of the rectifier circuit of FIG. 2.

Referring to FIG. 3, where like reference numbers are retained for simplicity, a second exemplary rectifier circuit 70 is shown to include a first and second storage choke, referred to as 72 and 74 respectively. The second storage choke 74 improves the quality of the output voltage through the outputs 36 and 34.

Turning to the present invention, a synchronous rectifier circuit of the present invention results in a "utilization rate" of at least 50%, approaching 80% under some conditions. This higher utilization rate significantly increases the efficiency of the power converter (reduces power loss) compared to other synchronous rectifier circuits because the current can flow through all devices a greater percentage of the time. When the current flows through all of the SynchFET's, the effective on-resistance is decreased by two resulting in a substantial decrease in dissipated power.

Figure 4:
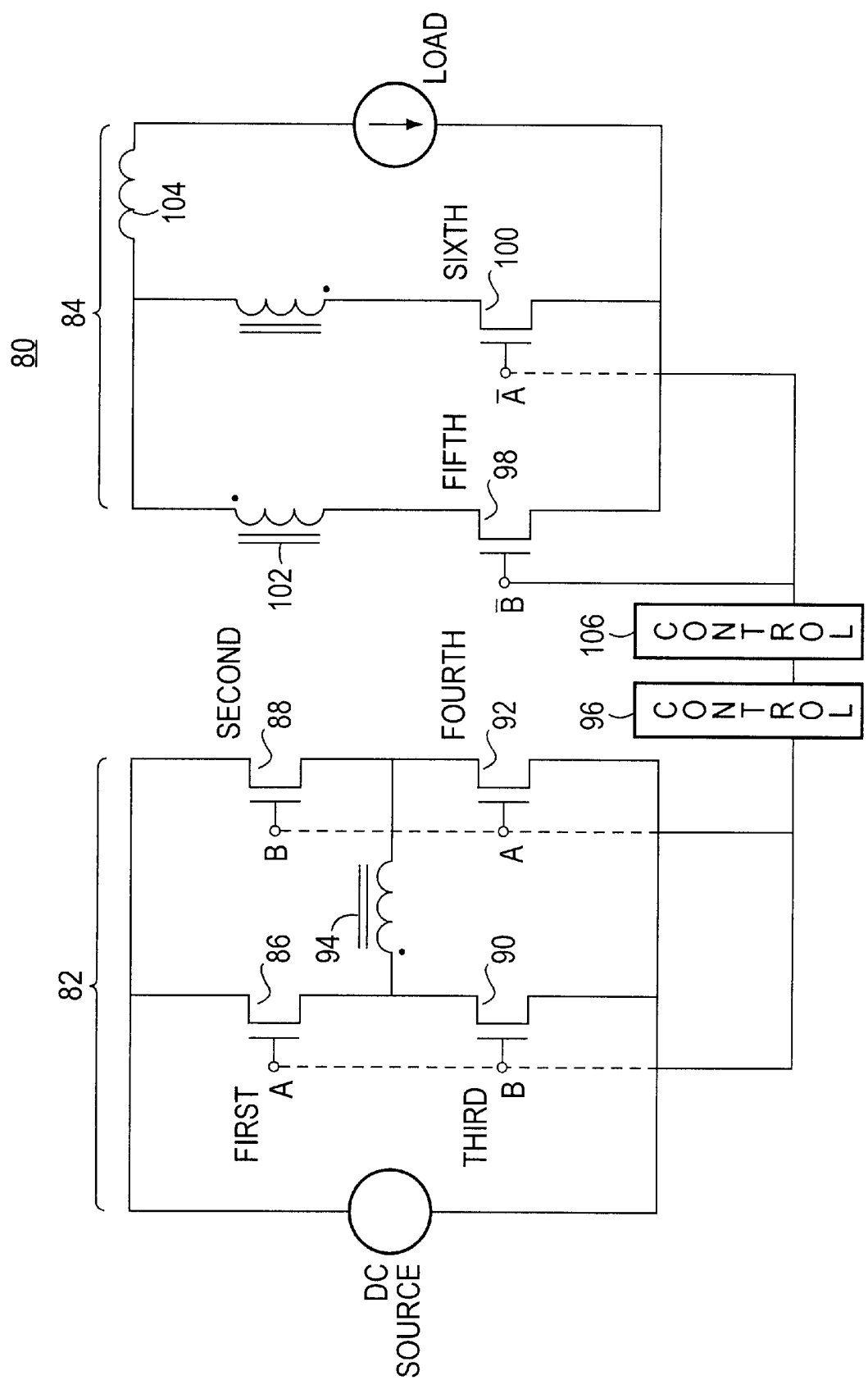
FIG. 4 is a block diagram of a first exemplary embodiment of a rectifier circuit of the present invention in a full bridge dc-dc converter.

Referring now to FIG. 4, a full bridge dc-dc converter 80 in accordance with the present invention is shown to include a primary side 82 and a secondary side 84. The primary side 82 is shown to include four switching devices, such as MOSFETs, labeled as 86, 88, 90, and 92 respectively, a primary side of a transformer 94, and control electronics 96. The secondary side 84 is shown to include two switching devices, such as synchFETS, labeled as 98 and 100, respectively, the secondary side of a center-tapped transformer 102, an inductor 104 and control electronics 106. Control electronics 106 and control electronics 96 are synchronized together.

In the operation of the dc-dc converter 80, the switches 86, 88, 90, 92, 98, and 100 are controlled in the following sequence at regular repeating intervals, whose timing relationship during one full period are: (switch 86 ON, switch 92 ON, switch 98 ON and switch 88 OFF, switch 90 OFF, switch 100 OFF); (switch 86 OFF, switch 88 OFF, switch 90 OFF, switch 92 OFF, switch 100 OFF, switch 98 ON); (switch 86 OFF, switch 88 OFF, switch 90 ON, switch 92 OFF, switch 98 OFF, switch 100 ON); (switch 86 OFF, switch 88 OFF, switch 90 OFF, switch 92 OFF, switch 98 OFF, switch 100 ON); (switch 88 ON, switch 90 ON, switch 100 ON, switch 86 OFF, switch 92 OFF, switch 98 OFF); (switch 86 OFF, switch 88 OFF, switch 90 OFF, switch 92 OFF, switch 98 OFF, switch 100 ON); (switch 86 OFF, switch 90 OFF, switch 92 OFF, switch 98 ON, switch 100 ON); as shown in the table of FIG. 6, repeat for next cycle.

In a second embodiment of the invention the standard full bridge dc-dc converter 80 of FIG. 4 uses an alternate switching sequence whereby the switches are controlled in the following sequence at regular repeating intervals: (switch 86 ON, switch 92 ON, switch 98 ON, switch 88 OFF, switch 90 OFF, switch 100 OFF); (switch 86 OFF, switch 88 OFF, switch 90 OFF, switch 100 OFF, switch 92 ON, switch 98 ON); (switch 86 OFF, switch 88 OFF, switch 90 ON, switch 92 ON, switch 98 ON, switch 100 ON); (switch 86 OFF, switch 88 OFF, switch 92 OFF, switch 98 OFF, switch 90 ON, switch 100 ON); (switch 88 ON, switch 90 ON, switch 100 ON, switch 86 OFF, switch 92 OFF, switch 98 OFF); (switch 86 OFF, switch 88 OFF, switch 92 OFF, switch 98 OFF, switch 90 ON, switch 100 ON); (switch 86 OFF, switch 88 OFF, switch 90 ON, switch 92 ON, switch 98 ON, switch 100 ON); as shown in the table of FIG. 7, repeat for next cycle.

The timing in the first embodiment and the second embodiment of the synchronous rectifier MOSFETs (SynchFETs) switches 98 and 100 ON-OFF cycles is related to the timing of 10 the main switching MOSFETs, switches 86, 88, 90, and 92 on the primary side 82 of the transformer 94.

Figure 5:
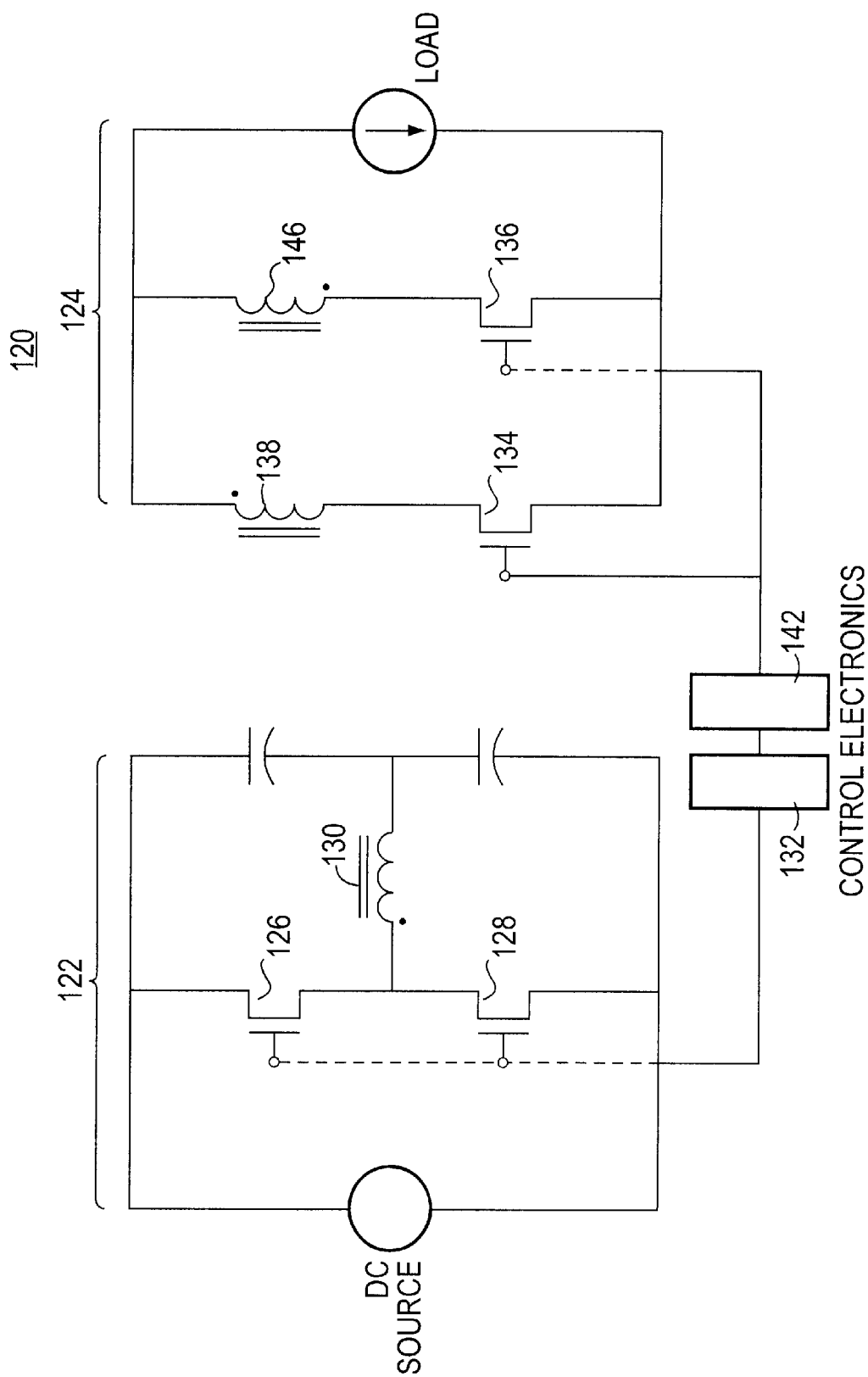
FIG. 5 is a block diagram of a third exemplary embodiment of a rectifier circuit of the present invention in a half-bridge dc-dc converter.

Referring to FIG. 5, in a third embodiment of the present invention, a half-bridge dc-dc converter 120 is shown to include a primary side 122 and a secondary side 124. The primary side 122 is shown to include two switching devices labeled as 126 and 128, respectively, a primary side of a transformer 130, and control electronics 132. The secondary side 124 is shown to include two switching devices labeled as 134 and 136, respectively, a secondary side of the transformer 138, an inductor 140 and control electronics 142. Control electronics 142 and control electronics 132 are synchronized together. In operation, the switches are controlled by the synchronized control electronics 132 and 142 in the following sequence at regular repeating intervals: (switch 126 ON, switch 134 ON, switch 128 OFF, switch 136 OFF); (switch 126 OFF, switch 128 OFF, switch 136 OFF, switch 134 ON); (switch 126 OFF, switch 128 OFF, switch 134 ON, switch 136 ON); (switch 126 OFF, switch 128 OFF, switch 134 OFF, switch 136 ON); (switch 126 OFF, switch 134 OFF, switch 128 ON, switch 136 ON); (switch 126 OFF, switch 128 OFF, switch 134 OFF, switch 136 ON); (switch 126 OFF, switch 128 OFF, switch 134 ON switch 136 ON); (switch 126 OFF, switch 128 OFF, switch 136 OFF, switch 134 ON); as shown in the table of FIG. 8, repeat for next cycle.

The timing of the synchronous rectifier MOSFETs (SynchFETs) switches 134 and 136 ON-OFF cycles is related to the timing of the main switching MOSFETs, switches 126 and 128 on the primary side 122 of the transformer 130.

The embodiments illustrated above according to the principles of the present invention produce circuits which result in all SynchFETs in the on-state at least fifty percent up to but not including one hundred percent of the switching period, all SynchFETs on at least seventy percent of the switching period for nominal input voltage conditions, the SynchFETs are never turned-on when a voltage is present from their drain to source otherwise known as zero-voltage-switching, results in clamping of the transformer winding voltage to zero volts during the time when all SynchFETs are simultaneously conducting, and results in less EMI generated by a floating transformer winding due to the clamping of the winding during the simultaneous conduction of all SynchFETs.

Having described a preferred embodiment of the invention, it will now become apparent to those skilled in the art that other embodiments incorporating its concepts may be provided. It is felt therefore, that this invention should not be limited to the disclosed invention, but should be limited only by the spirit and scope of the appended claims.

What is claimed is:

1. A half bridge dc-dc converter comprising:
a primary side, the primary side comprising:
a plurality of primary side switching devices comprising a first switching device and a second switching device, said first primary side switching device defining an A-side of the primary side and connected to a primary side of a transformer, said second primary side switching device defining a B-side of the primary side and connected to the primary side of the transformer;
and a primary side controller;
a secondary side, the secondary side comprising:
two secondary side switching devices, including a third and fourth switching device connected to a secondary side of the transformer,
an inductor, and
secondary side controller;
a central control, said central control synchronizing the primary side controller and the secondary side controller to execute a plurality of switching device timing relationship rules once per cycle;
said rules comprising:
first primary side switch ON, third secondary side switch ON, second primary side switch OFF, fourth secondary side switch OFF;
first primary side switch OFF, second primary side switch OFF, third secondary side switch ON, fourth secondary side switch ON;
first primary side switch OFF, third secondary side switch OFF, fourth secondary side switch ON;
first primary side switch OFF, third secondary side switch OFF, second primary side switch ON, fourth secondary side switch ON;
first primary side switch OFF, second primary side switch OFF, third secondary side switch OFF, fourth secondary side switch ON;
first primary side switch OFF, second primary side switch OFF, third secondary side switch ON, fourth secondary side switch ON;
first primary side switch OFF, second primary side switch OFF, fourth secondary side switch OFF, third secondary side switch ON;
repeat.

2. A half bridge dc-dc converter according to claim 1 wherein each of the plurality of primary side switching devices and each of the plurality of secondary side switching devices are metal oxide semi-conductor field effect transistors (MOSFETs).

3. A full bridge dc-dc converter comprising:
a transformer having a primary side winding and a secondary side winding, said secondary winding side having a center tap, said center tap connected to provide an output dc power connection;
a primary side, the primary side comprising:
a plurality of primary side switching devices including a first, a second, a third, and a fourth, switching devices, said first and second primary side switching device defining an A-side of the primary side and connected to a primary side of a transformer, said third and fourth primary side switching device defining a B-side of the primary side and connected to the primary side of the transformer;
and a primary side controller;
a secondary side, the secondary side comprising:
two secondary side switching devices including a fifth and a sixth switching device, said fifth and sixth switching device connected to a secondary side of the transformer,
an inductor, and
secondary side controller;
a central control, said central control synchronizing the primary side controller and the secondary side controller; and said central control storing a plurality of switching device timing relationship rules, said plurality of switching device timing relationship rules executing once per cycle;
said rules comprising:
first primary side switch, fourth primary side switch, fifth secondary side switch on and second primary side switch, third primary side switch sixth secondary side switch off;
first primary side switch, second primary side switch, third primary side switch, fourth primary side switch, sixth secondary side switch off and fifth secondary side switch on;
first primary side switch, second primary side switch, third primary side switch, fourth primary side switch off and fifth secondary side switch, sixth secondary side switch on;
first primary side switch, second primary side switch, third primary side switch, fourth primary side switch, fifth secondary side switch off and sixth secondary side switch on;
second primary side switch, third primary side switch, sixth secondary side switch on and first primary side switch, fourth primary side switch, fifth secondary side switch off;
first primary side switch, second primary side switch, third primary side switch, fourth primary side switch, fifth secondary side switch off and sixth secondary side switch on; and
first primary side switch, second primary side switch, third primary side switch, fourth primary side switch off and fifth secondary side switch, sixth secondary side switch on.

4. A full bridge dc-dc converter comprising:
a transformer having a primary side winding and a secondary side winding, said secondary winding side having a center tap, said center tap connected to provide an output dc power connection;
a primary side, the primary side comprising:
a plurality of primary side switching devices including a first a second a third and a fourth, switching devices, said first and second primary side switching device defining an A-side of the primary side and connected to a primary side of a transformer, said third and fourth primary side switching device defining a B-side of the primary side and connected to the primary side of the transformer;
and a primary side controller;
a secondary side, the secondary side comprising:
two secondary side switching devices including a fifth and a sixth switching device, said fifth and sixth switching device connected to a secondary side of the transformer,
an inductor, and
secondary side controller;
a central control, said central control synchronizing the primary side controller and the secondary side controller, said central control storing a plurality of switching device timing relationship rules, said plurality of switching device timing relationship rules executing once per cycle;

said rules comprising:

first primary side switch, fourth primary side switch fifth secondary side switch on, second primary side switch third primary side switch sixth secondary side switch off;

first primary side switch, second primary side switch, third primary side switch, sixth secondary side switch off, fourth primary side switch, fifth secondary side switch on;

first primary side switch, second primary side switch off, third primary side switch, fourth primary side switch, fifth secondary side switch, sixth secondary side switch on;

first primary side switch, second primary side switch, fourth primary side switch, fifth secondary side switch off, third primary side switch, sixth secondary side switch on;

second primary side switch, third primary side switch, sixth secondary side switch on, first primary side switch, fourth primary side switch, fifth secondary side switch off;

first primary side switch, second primary side switch, fourth primary side switch, fifth secondary side switch off, third primary side switch, sixth secondary side switch on; and first primary side switch, second primary side switch off, third primary side switch, fourth primary side switch, fifth secondary side switch, sixth secondary side switch on.

5. A full bridge dc-dc converter comprising:

a primary side, the primary side comprising:
a plurality of primary side switching devices including a first, a second, a third, and a fourth, switching devices, said first and second primary side switching device defining an A-side of the primary side and connected to a primary side of a transformer, said third and fourth primary side switching device defining a B-side of the primary side and connected to the primary side of the transformer;

and a primary side controller;

a secondary side, the secondary side comprising:
a plurality of secondary side switching devices including a fifth and a sixth switching device, said fifth and sixth switching device connected to a secondary side of the transformer,
an inductor, and
secondary side controller;

a central control, said central control synchronizing the primary side controller and the secondary side controller through storing a plurality of switching device timing relationship rules, said plurality of switching device timing relationship rules executing once per cycle;

said rules comprising:

first primary side switch, fourth primary side switch, fifth secondary side switch on and second primary side switch, third primary side switch, sixth secondary side switch off;

first primary side switch, second primary side switch, third primary side switch, fourth primary side switch, sixth secondary side switch off and fifth secondary side switch on;

first primary side switch, second primary side switch, third primary side switch, fourth primary side switch off and fifth secondary side switch, sixth secondary side switch on;

first primary side switch, second primary side switch, third primary side switch, fourth primary side switch, fifth secondary side switch off and sixth secondary side switch on;

second primary side switch, third primary side switch, sixth secondary side switch on and first primary side switch, fourth primary side switch, fifth secondary side switch off;

first primary side switch, second primary side switch, third primary side switch, fourth primary side switch, fifth secondary side switch off and sixth secondary side switch on; and first primary side switch, second primary side switch, third primary side switch, fourth primary side switch off and fifth secondary side switch, sixth secondary side switch on.

6. A full bridge dc-dc converter comprising:

a primary side, the primary side comprising:
a plurality of primary side switching devices including a first, a second, a third, and a fourth, switching devices, said first and second primary side switching device defining an A-side of the primary side and connected to a primary side of a transformer, said third and fourth primary side switching device defining a B-side of the primary side and connected to the primary side of the transformer;

and a primary side controller;

a secondary side, the secondary side comprising:
a plurality of secondary side switching devices including a fifth and a sixth switching device, said fifth and sixth switching device connected to a secondary side of the transformer,
an inductor, and
secondary side controller;

a central control, said central control synchronizing the primary side controller and the secondary side controller through storing a plurality of switching device timing relationship rules, said plurality of switching device timing relationship rules executing once per cycle;

said rules comprising:

first primary side switch, fourth primary side switch, fifth secondary side switch on, second primary side switch, third primary side switch, sixth secondary side switch off;

first primary side switch, second primary side switch, third primary side switch, sixth secondary side switch off, fourth primary side switch, fifth secondary side switch on;

first primary side switch, second primary side switch off, third primary side switch, fourth primary side switch, fifth secondary side switch, sixth secondary side switch on;

first primary side switch, second primary side switch, fourth primary side switch, fifth secondary side switch off, third primary side switch, sixth secondary side switch on;

second primary side switch, third primary side switch, sixth secondary side switch on, first primary side switch, fourth primary side switch, fifth secondary side switch off;

first primary side switch, second primary side switch, fourth primary side switch, fifth secondary side switch off, third primary side switch, sixth secondary side switch on; and first primary side switch, second primary side switch off, third primary side switch, fourth primary side switch, fifth secondary side switch, sixth secondary side switch on.

7. A half bridge dc-dc converter comprising:

a primary side, the primary side comprising:
  a plurality of primary side switching devices, a first primary side switching device defining an A-side of the primary side and connected to a primary side of a transformer, a second primary side switching device defining a B-side of the primary side and connected to the primary side of the transformer; and a primary side controller;

a secondary side, the secondary side comprising:
  a plurality of secondary side switching devices, including a third and fourth switching device connected to a secondary side of the transformer,
  an inductor, and
  secondary side controller;

a central control, said central control synchronizing the primary side controller and the secondary side controller to store a plurality of switching device timing relationship rules, said plurality of switching device timing relationship rules executing once per cycle;

said rules comprising:

first primary side switch ON, third secondary side switch ON, second primary side switch OFF, fourth secondary side switch OFF;

first primary side switch OFF, second primary side switch OFF, fourth secondary side switch OFF, third secondary side switch ON;

first primary side switch OFF, second primary side switch OFF, third secondary side switch ON fourth secondary side switch ON;

first primary side switch OFF, third secondary primary side switch OFF, fourth secondary side switch ON fourth secondary side switch ON;

first primary side switch OFF, third secondary side switch OFF, second primary side switch ON, fourth secondary side switch ON;

first primary side switch OFF, second primary side switch OFF, third secondary side switch OFF, fourth secondary side switch ON;

first primary side switch OFF, second primary side switch OFF, third secondary side switch ON; fourth secondary side switch ON;

first primary side switch OFF, second primary side switch OFF, fourth secondary side switch OFF, third secondary side switch ON;

repeat.

* * * * *